US007813264B2

(12) United States Patent
Haq et al.

(10) Patent No.: US 7,813,264 B2
(45) Date of Patent: Oct. 12, 2010

(54) HIGH CAPACITY ROUTER HAVING REDUNDANT COMPONENTS

(75) Inventors: Anis Haq, Mountain View, CA (US);
Lawrence Hui, Sunnyvale, CA (US);
Scott Chew, Redwood City, CA (US);
Unmesh Agarwala, San Jose, CA (US);
Michael Beesley, Hillsborough, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 929 days.

(21) Appl. No.: 11/084,121

(22) Filed: Mar. 21, 2005

(65) Prior Publication Data

US 2005/0163044 A1 Jul. 28, 2005

Related U.S. Application Data

(63) Continuation of application No. 09/716,352, filed on Nov. 21, 2000, now Pat. No. 6,885,635.

(51) Int. Cl.
*G01R 31/08* (2006.01)
(52) U.S. Cl. .............................. 370/217; 370/392; 710/3
(58) Field of Classification Search ................. 370/210, 370/218–220, 401, 402, 217, 389; 714/1–3; 710/3
See application file for complete search history.

(56) References Cited

U.S. PATENT DOCUMENTS

| 4,755,986 | A | * | 7/1988 | Hirata ......................... 370/392 |
| 5,185,736 | A | * | 2/1993 | Tyrrell et al. ................. 370/358 |
| 5,473,599 | A | | 12/1995 | Li et al. ....................... 370/219 |
| 5,848,227 | A | | 12/1998 | Sheu .............................. 714/4 |
| 5,963,540 | A | | 10/1999 | Bhaskaran .................. 370/218 |
| 6,148,410 | A | | 11/2000 | Baskey et al. ................. 714/4 |
| 6,285,656 | B1 | * | 9/2001 | Chaganty et al. ............ 370/228 |
| 6,327,243 | B1 | * | 12/2001 | Gregorat ..................... 370/218 |
| 6,359,858 | B1 | | 3/2002 | Smith et al. .................. 370/217 |
| 6,442,634 | B2 | * | 8/2002 | Bronson et al. ............. 710/260 |
| 6,449,250 | B1 | | 9/2002 | Otani et al. .................. 370/219 |
| 6,490,246 | B2 | | 12/2002 | Fukushima et al. ......... 370/220 |
| 6,658,595 | B1 | | 12/2003 | Thamattoor .................. 714/11 |
| 6,826,195 | B1 | * | 11/2004 | Nikolich et al. ............. 370/465 |

* cited by examiner

*Primary Examiner*—Seema S Rao
*Assistant Examiner*—Sai-Ming Chan
(74) *Attorney, Agent, or Firm*—Harrity & Harrity, LLP

(57) ABSTRACT

A router includes multiple routing engines. If the active routing engine fails, a backup one of the routing engines detects the failure and assumes the role of active routing engine. A redundancy controller circuit, connected to the multiple routing engines, facilitates the selection and switching of the routing engines. Portions of the packet forwarding engine, in addition to the routing engine, may be redundantly implemented. The active routing engine controls the selection of the redundant portion of the packet forwarding engine.

17 Claims, 8 Drawing Sheets

HIGH CAPACITY ROUTER HAVING REDUNDANT COMPONENTS

This application is a Continuation of commonly assigned, U.S. patent application Ser. No. 09/716,352, filed Nov. 21, 2000, now U.S. Pat. No. 6,885,635 for HIGH CAPACITY ROUTER HAVING REDUNDANT COMPONENTS, the disclosure of which is hereby incorporated herein by reference.

BACKGROUND OF THE INVENTION

A. Field of the Invention

The present invention relates generally to routing systems, and, more particularly, to highly reliable routing systems.

B. Description of Related Art

Conventional networks typically include routers that route packets from one or more sources to one or more destinations. A packet is a variable size record that is transmitted through a network. A router is a switching device that receives packets containing data and control information at input ports, and, based on destination or other, information included in the packets, routes the packets to appropriate output ports that lead to either the next router in the packet's journey or to the packet's final destination. Routers determine the proper output port for a particular packet by evaluating header information included in the packet.

Routers come in various sizes and capacities. A low capacity, relatively inexpensive router, for example, may be used in a home network to route data between three or four personal computers. At the other end of the router spectrum are high-performance routers commonly used by telecommunication companies and internet service providers to provide feature rich, high bandwidth packet routing. High-performance routers may process packets for many thousands of different end users. Accordingly, it is an important feature of these routers that they do not fail.

Therefore, it is desirable to increase the reliability of a router. This need is particularly acute in high-performance routers.

SUMMARY OF THE INVENTION

The present invention addresses the need to increase the reliability of a router by providing a router having redundant components.

One aspect is directed to a router comprising a first routing engine configured to maintain a first routing table for storing routing information for a network and a second routing engine configured to maintain a second routing table for storing routing information for the network. The router further comprises a redundancy controller connected to the first and second routing engines and configured to maintain the first and second routing engines in a redundant configuration.

Another aspect is directed to a router for routing packets in a network. The router includes at least one processing component configured to determine destination information for the packets and a plurality of routing engines configured to maintain routing tables that contain packet routing information and supply the routing tables to the at least one processing component, one of the plurality of routing engines being an active routing engine and the other of the plurality of routing engines being non-active routing engines.

Yet another aspect is directed to a method of controlling a router having redundant components, including at least first and second routing engines coupled to a packet forwarding engine. The method includes setting the first routing engine of the router to an active state, the first routing engine communicating with the packet forwarding engine while in the active state; setting the second routing engine of the router to a standby state; monitoring the first routing engine for a failure in the first routing engine; and controlling the second routing engine to assume the active state when a failure is detected in the first routing engine.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As described herein, a router includes multiple routing engines (REs) and packet processing components. During operation, one of the routing engines and one of the processing components act as a redundant backup component. A redundant controller circuit facilitates a reset of the router, through which an active routing engine takes control of the system.

Figure 1:
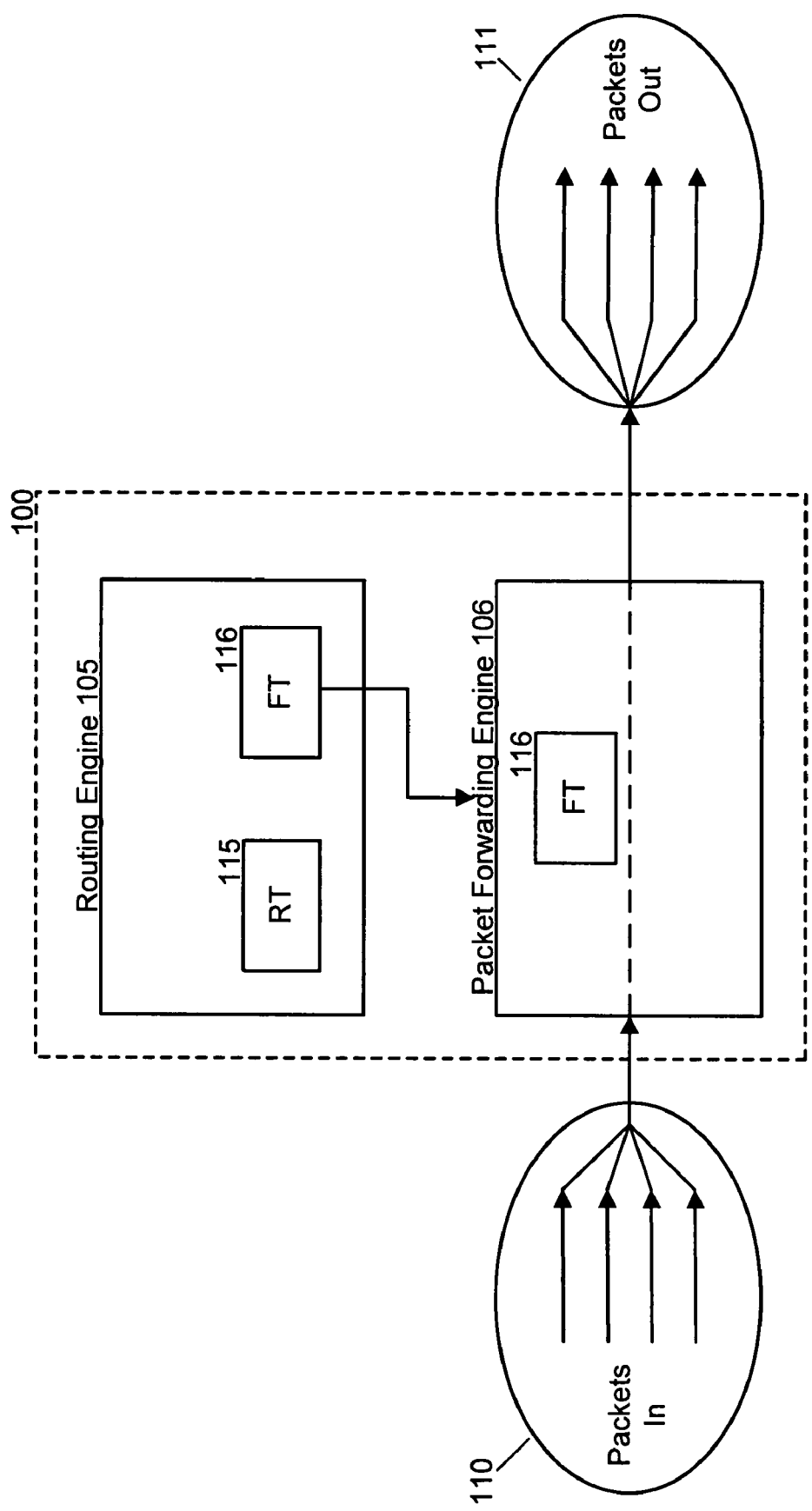
FIG. 1 is a diagram illustrating the high-level functional components of a router.

FIG. 1 is a diagram illustrating, at a high-level, functional components of an exemplary router 100. In general, router 100 receives incoming packets 110, determines the next destination (the next "hop" in the network) for the packets, and outputs the packets as outbound packets 111 on physical links that lead to the next destination. In this manner, packets "hop" from router to router in a network until reaching their final destination.

Router 100 includes routing engine 105 and a packet forwarding engine (PFE) 106. Routing engine 105 may maintain one or more routing tables (RTs) 115 and a forwarding table (FT) 116. Through routing tables 115, routing engine 105 consolidates routing information that the routing engine learns from the routing protocols of the network. From this routing information, the routing protocol process may determine the active routes to network destinations and install these routes into forwarding table 116. Packet forwarding engine 106 may consult forwarding table 116 when determining the next destination for incoming packets 110.

Figure 2:
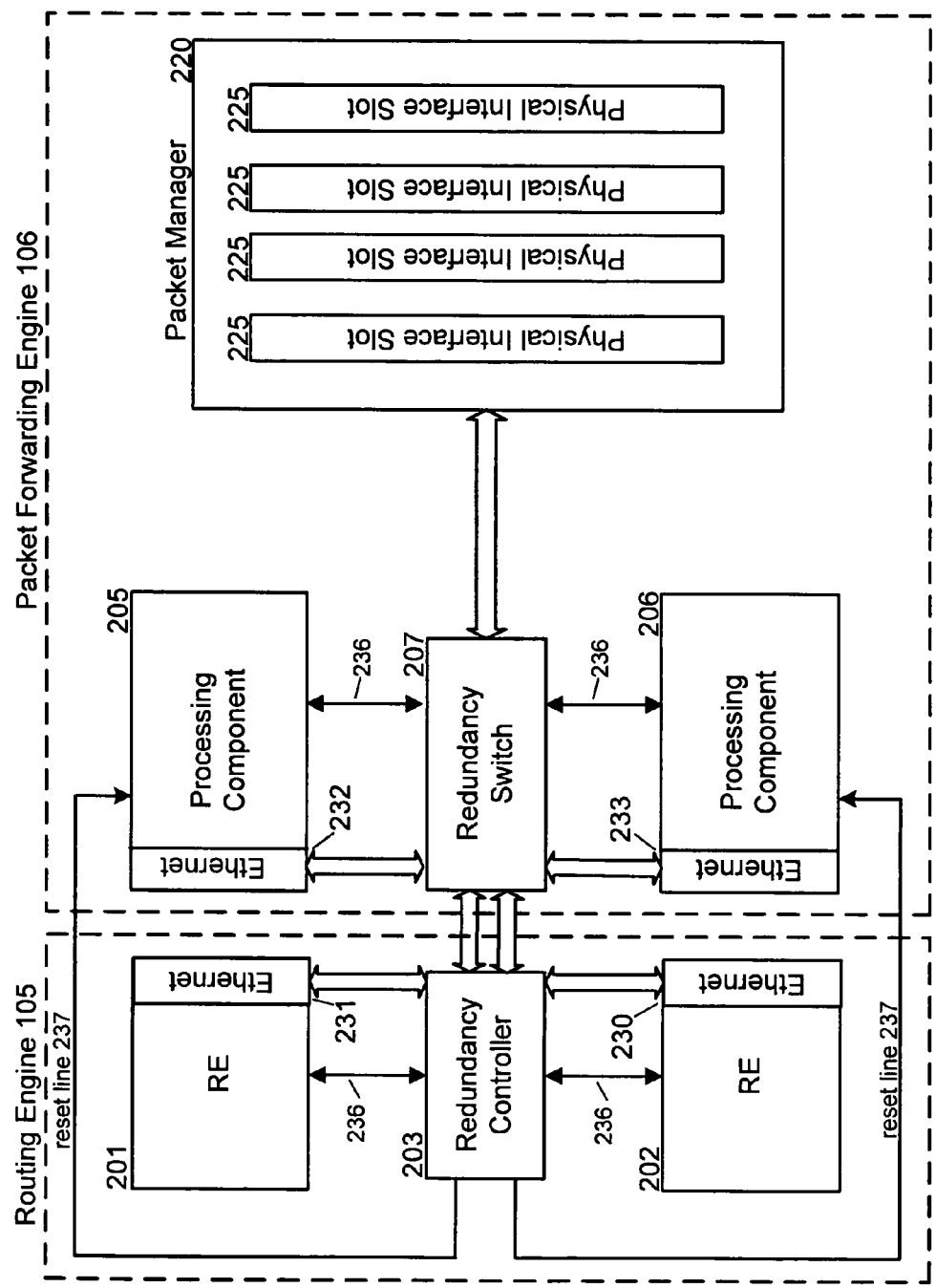
FIG. 2 is a diagram illustrating a more detailed implementation of a router consistent with the present invention.

FIG. 2 is a diagram illustrating, in more detail, an implementation of router 100 consistent with an aspect of the present invention. Routing engine 105 is implemented as two redundant routing engines, labeled as routing engine RE 201 and RE 202. Redundancy controller 203 is connected to REs 201-202 and facilitates the selection of the active routing engine 201 or 202. At any given time, only one of REs 201-202 actively provides a forwarding table to packet forwarding engine 106. The other, non-active, routing engine acts as a standby routing engine.

In addition to having redundant REs 201-202, router 100 includes redundant processing components 205 and 206. Processing components 205 and 206 may perform the high-level functions of packet forwarding engine 106, including determining the correct destination output port for the input packets. More particularly, processing components 205 and 206 may store the forwarding table constructed by RE 201 or 202 and receive the packet control information from packet manager 220. The processing components may then use the forwarding tables to lookup the output port for the packet based on its control information.

Redundancy switch 207 connects processing components 205 and 206 to packet manager 220 and to redundancy controller 203. Destination information, determined by processing component 205 or 206, is transmitted to packet manager 220, through redundancy switch 207. Packet manager 220 may then transmit the packet on its appropriate output ports, as determined by processing component 205 or 206.

Packet manager 220 generally handles input/output functions related to the incoming and outgoing packets. More particularly, packet manager 220 may receive the incoming packets and forward the packet control information (also called header information) to redundancy switch 207. In order to conserve bandwidth in transmitting the header information to redundancy switch 207 and processing components 205-206, packet manager 220 may strip the packet header information from the packet body. The body may be stored by packet manager 220, with only the header being transmitted to redundancy switch 207. The processed header, including its destination port, may subsequently be received by packet manager 220, which reassembles and transmits the packet.

Packet manager 220 may include a number of physical interface slots 225, each of which may include one or more physical interfaces. A physical interface slot 225, for example, may include an Ethernet card and an optical interface card such as a card supporting the OC-12 optical transmission standard. Packets received over one physical interface, after processing, may be transmitted over another one of the physical interfaces. In this manner, router 100 can support packet routing over a network constructed using heterogeneous transmission components.

The components of FIG. 2 communicate with one another via a number of signal and data paths. As shown, REs 201-202 and processing components 205-206 include Ethernet ports 230-233 through which the routing engines and processing components transfer data. In addition to the Ethernet connections, signal lines 236 and 237 are shown, over which redundancy control information is transmitted between the various components shown in FIG. 2.

Although Ethernet ports 230-233 were described in implementing the data paths in FIG. 2, other communication technologies may alternatively be used.

Figure 3:
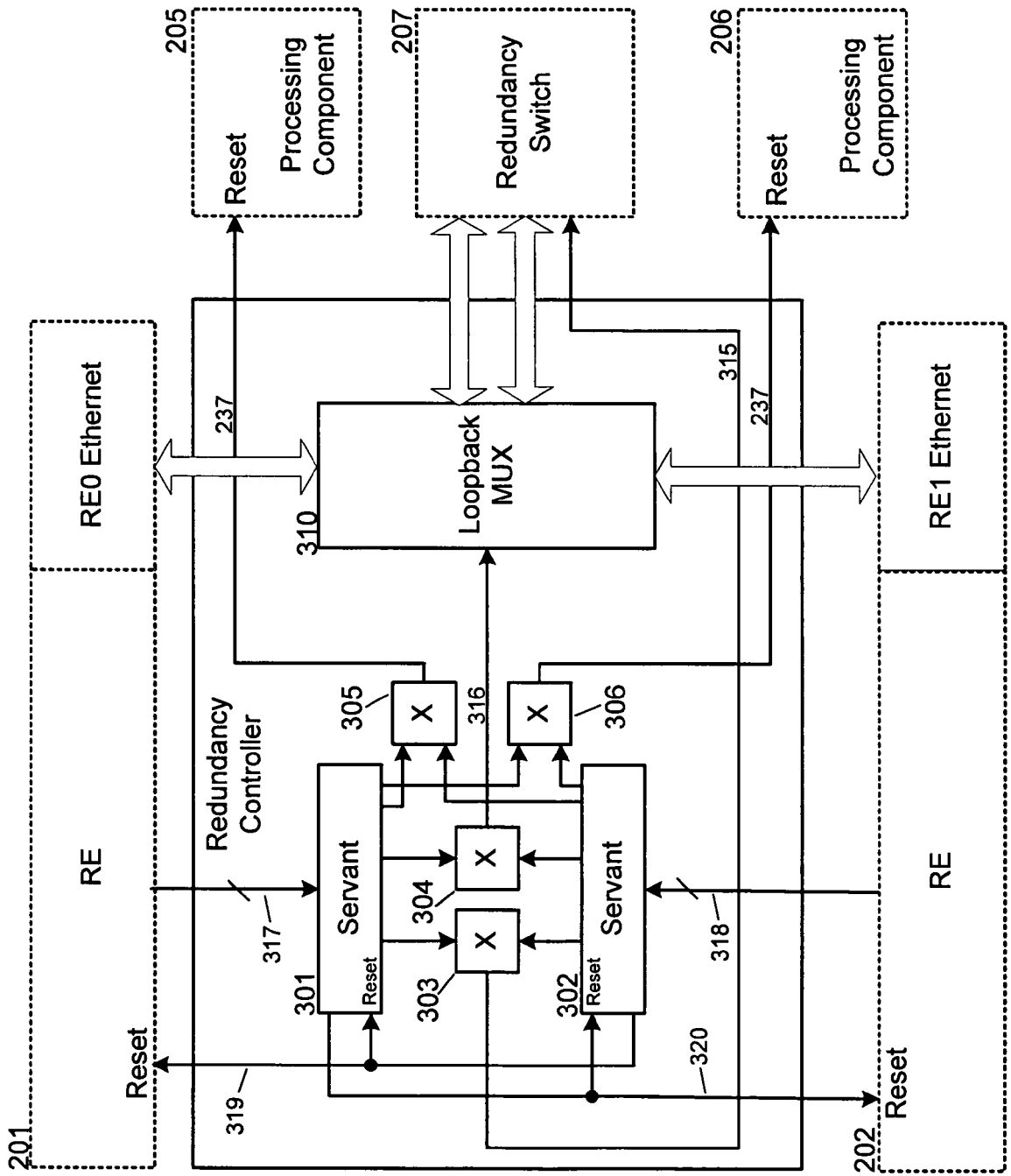
FIG. 3 is a diagram illustrating a more detailed view of the redundancy controller for the router shown in FIG. 2.

FIG. 3 is a diagram illustrating a more detailed view of redundancy controller 203. Redundancy controller 203 includes two servant circuits 301 and 302, that, based on signals from REs 201 and 202, activate switches 303-306. The output of switches 303-306 dictates the state of processing component 205, processing component 206, redundancy switch 207, and loopback multiplexer (MUX) 310. Loopback MUX 310 appropriately routes data flow between either RE 201 or RE 202, and redundancy switch 207. Signal lines 315-320, which were broadly illustrated in FIG. 2 as lines 236, transmit redundancy control information within router 100. The function of these lines will be explained in more detail below.

Figure 4:
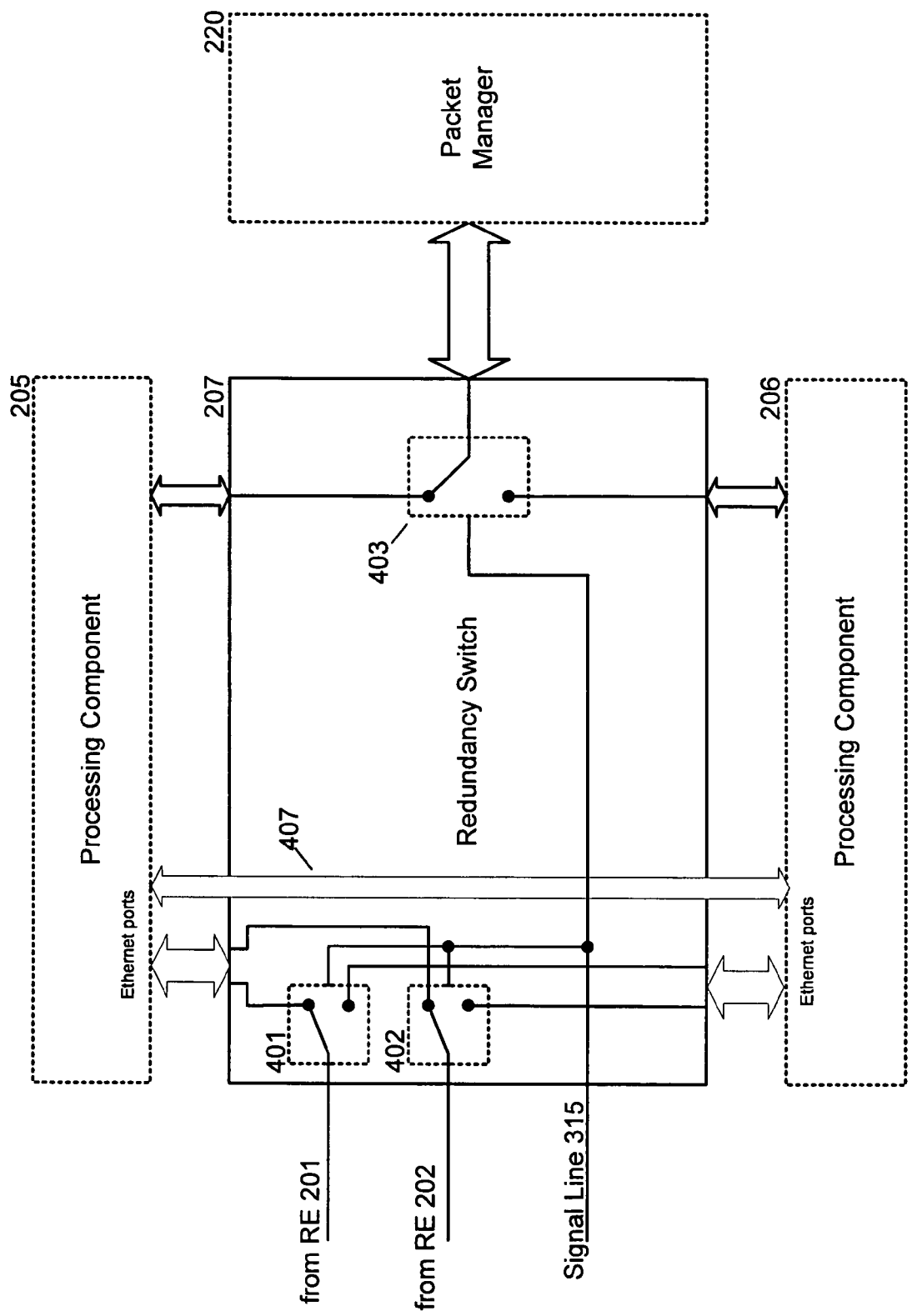
FIG. 4 is a diagram illustrating a more detailed view of the redundancy switch for the router shown in FIG. 2.

FIG. 4 is a diagram illustrating a more detailed view of redundancy switch 207. Redundancy switch 207 connects one of processing components 205-206 to packet manager 220 and REs 201-202. This connection is functionally illustrated in FIG. 4 using switches 401-403, each under control of the signal line 315. Switches 401-403 operate in one of two modes. In the first mode, switches 401-403 may connect processing component 205 to REs 201-202 and packet manager 220. In the second mode, switches 401-403 may connect processing component 206 to REs 201-202 and packet manager 220. Bus 407 directly connects processing components 205 and 206, allowing the standby processing component to communicate with and potentially store the present state of the active processing component. If the active processing component fails, the standby processing component can then immediately assume operation.

The operation of router 100 as it relates to the redundant routing engine and processing component will now be discussed.

Router 100, when turned on, performs a power-up sequence to initially come on-line. During this initialization process, router 100 decides which of the redundant routing engines 201-202 and processing components 205-206 to use. The user or manufacturer may pre-configure one of REs 201-202 and processing components 205-206 to be the preferred active component at power-up. The routing engine and processing component not configured as the preferred active components are the preferred standby components. In this situation, if all the components come on-line without errors, the preferred active components take control of the system.

Figure 5:
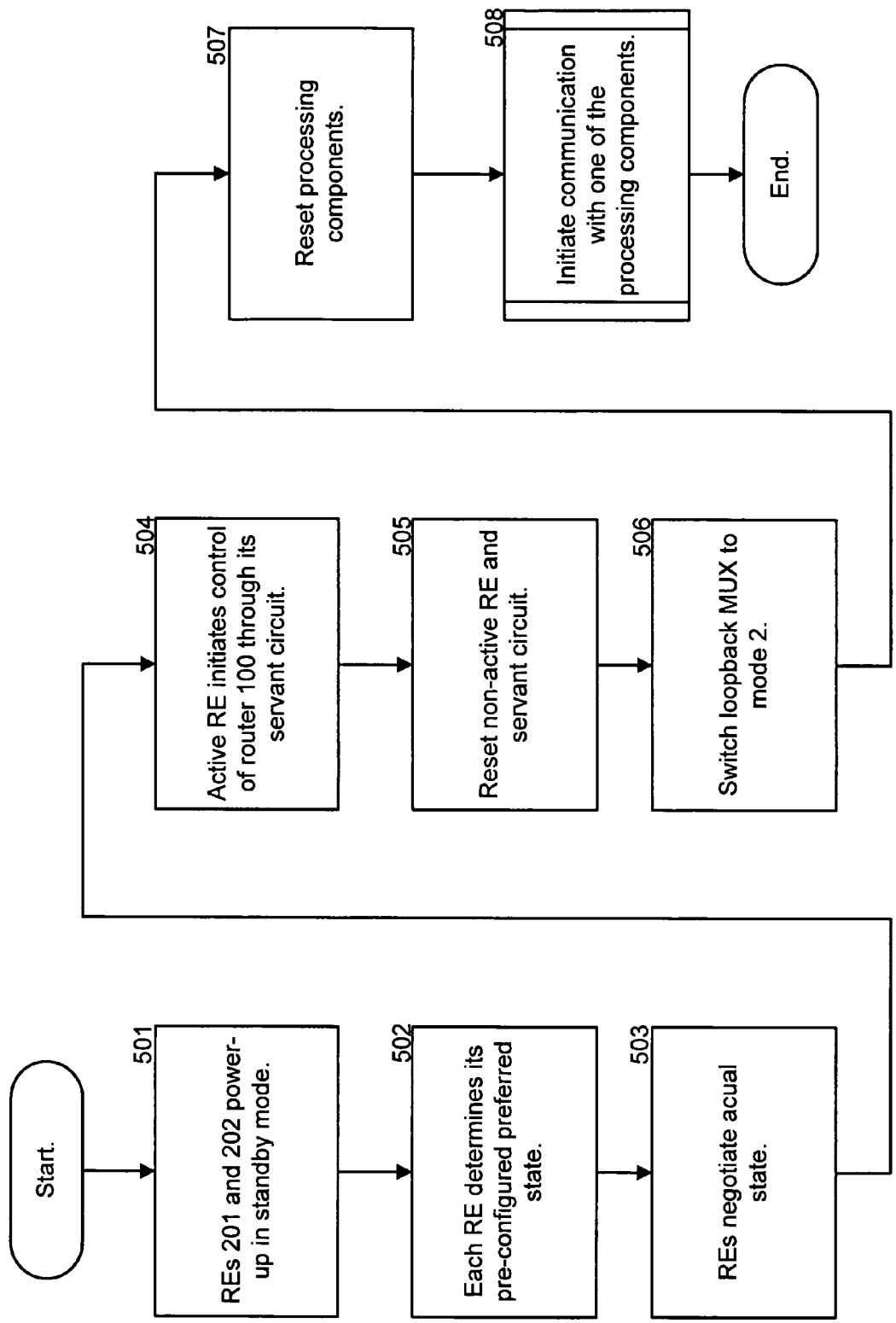
FIGS. 5 and 6 are flow charts illustrating methods, consistent with the present invention, for powering-up the router.
Figure 8A:
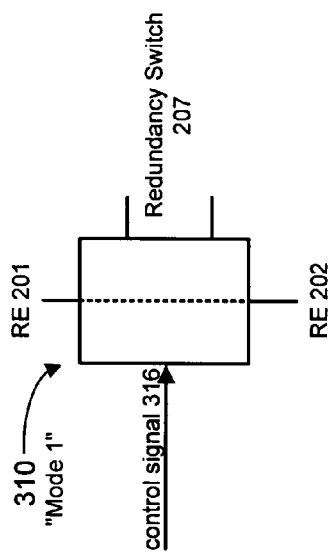
FIGS. 8A-8C are diagrams illustrating the loopback multiplexer for the router shown in FIG. 2.
Figure 8B:
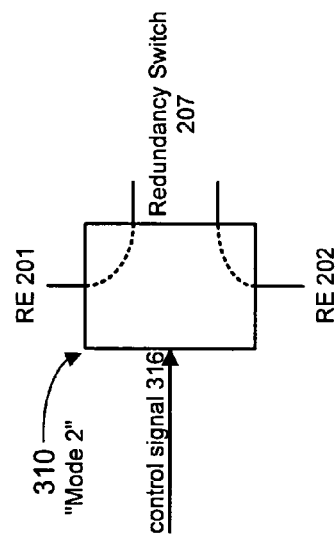

FIG. 5 is a flow chart illustrating methods consistent with the present invention for powering-up router 100. On power-up, REs 201 and 202 both perform their initial power-up sequence and, if power-up is successful, come on-line in standby mode. (Act 501). At this time, loopback MUX 310, which operates in one of two modes, is in its first mode, "mode 1." FIGS. 8A and 8B illustrate "mode 1" and "mode 2," respectively, of loopback MUX 310. As shown, in mode 1 (FIG. 8A), REs 201 and 202 are connected together through their Ethernet connections. After successfully coming on-line in standby mode, each RE 201 and 202 consults its pre-configured preferred setting to determine whether the RE is the active or standby RE. (Act 502).

Based on their pre-configured settings, REs 201 and 202 negotiate their actual state over the communication line through loopback MUX 310. (Act 503). Table I is an exemplary logic table defining possible negotiation rules. As shown in Table I, if one of the routing engines does not come on line (i.e., it is disabled, not present, or otherwise faulty), the other routing engine assumes the active status. In this situation, the RE that is on-line may wait a predetermined time period before assuming that the other routing engine is not going to come on-line. Once an RE takes control after assuming that the other RE is disabled and is not going to come on-line, the RE that takes control may not relinquish control even if the off-line RE eventually comes on-line and is the pre-configured preferred RE.

TABLE I

| Initial Configuration: | | Result of Negotiation: | |
|---|---|---|---|
| RE 201 | RE 202 | RE 201 | RE 202 |
| Active | Active | Active | Standby |
| Active | Standby | Active | Standby |
| Active | Disabled (e.g., not present) | Active | Disabled |
| Standby | Active | Standby | Active |
| Standby | Standby | Active | Standby |
| Standby | Disabled | Active | Disabled |
| Disabled | Active | Disabled | Active |
| Disabled | Standby | Disabled | Active |
| Disabled | Disabled | Disabled | Disabled |

After the REs negotiate which is to be the active RE and which is to be the standby RE, the active RE asserts its control of router 100 by signalling as much to servant circuit 301 or servant circuit 302 through signal lines 317 (RE 201 active) or 318 (RE 202 active). (Act 504). In response, the corresponding servant 301 or 302 initiates a "reset" operation that establishes the active routing engine's control of router 100.

In response to a reset operation initiated by RE 201, servant circuit 301 may activate line 320, which resets RE 202 and servant circuit 302. (Act 505). Resetting servant circuit 302 causes it to source a logic high value (i.e., a logic "1") to switches 303-306. Each of switches 303-306 may be configured as a switch that outputs one of its two inputs. One possible implementation for switches 303-306 is as a logical AND gate. With this logical AND configuration, when a first input to the switch is logic high, the output of the switch is equal to the second input. Accordingly, when servant circuit 302 sources logic high values to switches 303-306 after it is reset, switches 303-306 effectively act as pass through circuits for the values received from servant circuit 301. In this manner, switches 303-306 and servants 301 and 302 implement "deadlock recovery" of the REs 201-202, because even if an RE fails, the redundant RE is guaranteed the ability to control the router 100 by resetting the corresponding servant circuit.

Figure 8C:
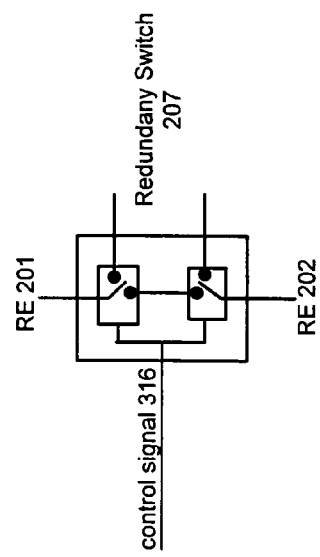

Servant circuit 301 may then change the operational mode of loopback MUX 310, through switch 304, to mode 2. (Act 506). As shown in FIG. 8B, in mode 2, loopback MUX 310 forwards data from REs 201 and 202 to redundancy switch 207. The active RE, RE 201, resets processing component 205 and 206 through switches 305 and 306. (Act 507). Finally, RE 201 initiates communication with one of components 205 or 206. (Act 508). FIG. 8C is a logical view of a possible implementation of loopback MUX 310. As shown, the switch logic in loopback MUX 310 can be simply shown as a pair of switches under the control of a single control signal line 316.

Figure 6:
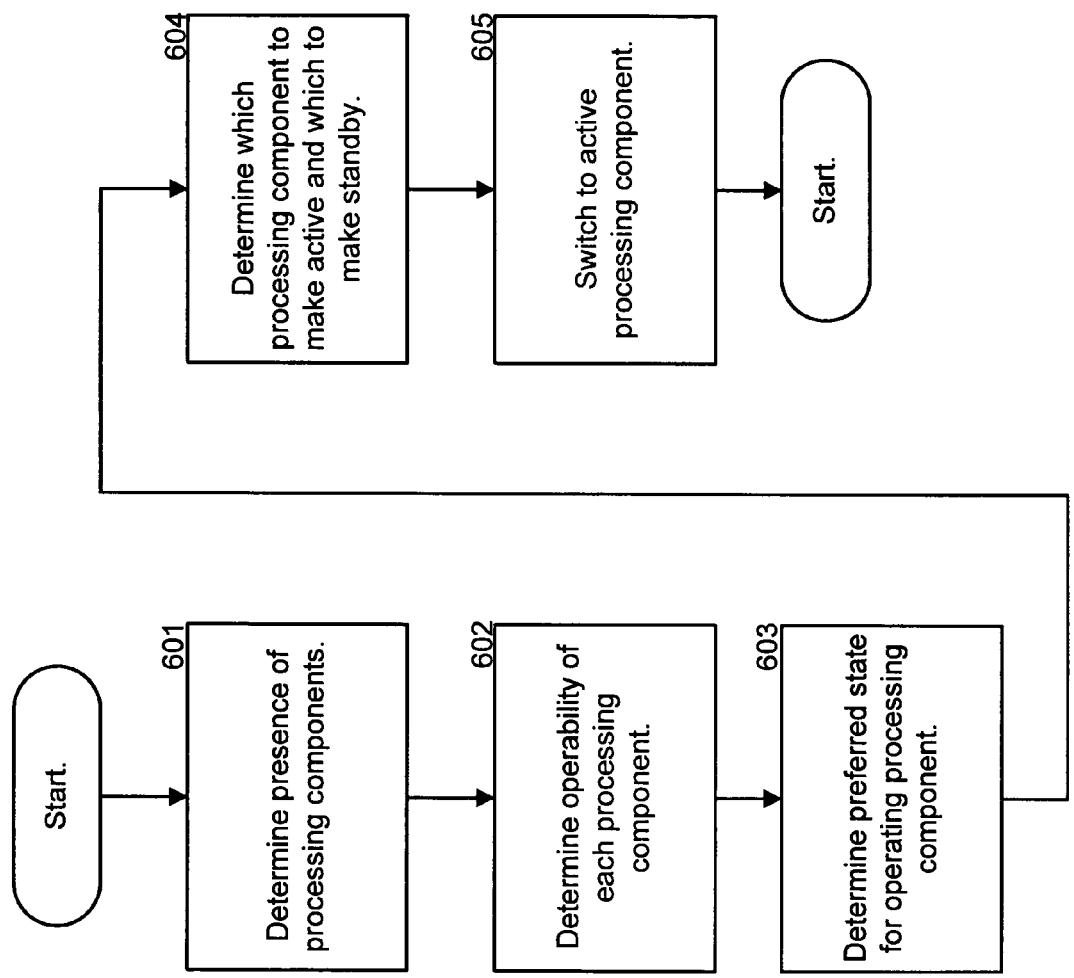

FIG. 6 is a flow chart illustrating Act 508, in which the active RE (RE 201) initiates communication with one of the processing components, in additional detail. RE 201 begins by determining the presence of processing components 205 and 206. (Act 601). This may be accomplished, for example, by detecting the presence of a pin on the processing components. RE 201 next exchanges information with each detected processing component to determine the operability of the processing components. (Act 602). As with REs 201 and 202, the processing components 205 and 206 may also be associated with a pre-configured default state stating whether the processing component should be brought on-line as an active or backup processing component. RE 201 determines the preferred state for each of the operating processing components. (Act 603). The preferred state may be, for example, pre-stored in each RE or transmitted to the RE by the processing component when it initially exchanges information with the RE in Act 602. Based on the information gathered in Acts 601, 602, and 603 (i.e., the presence, operability, and preferred state of each processing component), the RE 201 determines which processing component to make active and which to make standby. (Act 604). This decision can be made with a pre-stored decision table similar to Table 1. Through switch 303, RE 201 may control redundancy switch 207 to connect the active processing component 205 or 206. (Act 605).

Although the techniques discussed-above for powering-up router 100 assumed RE 201 was the active routing engine, the methods would be similar when RE 202 is the active RE, as redundant controller 203 and redundancy switch 207 are symmetrical with respect to REs 201 and 202.

Figure 7:
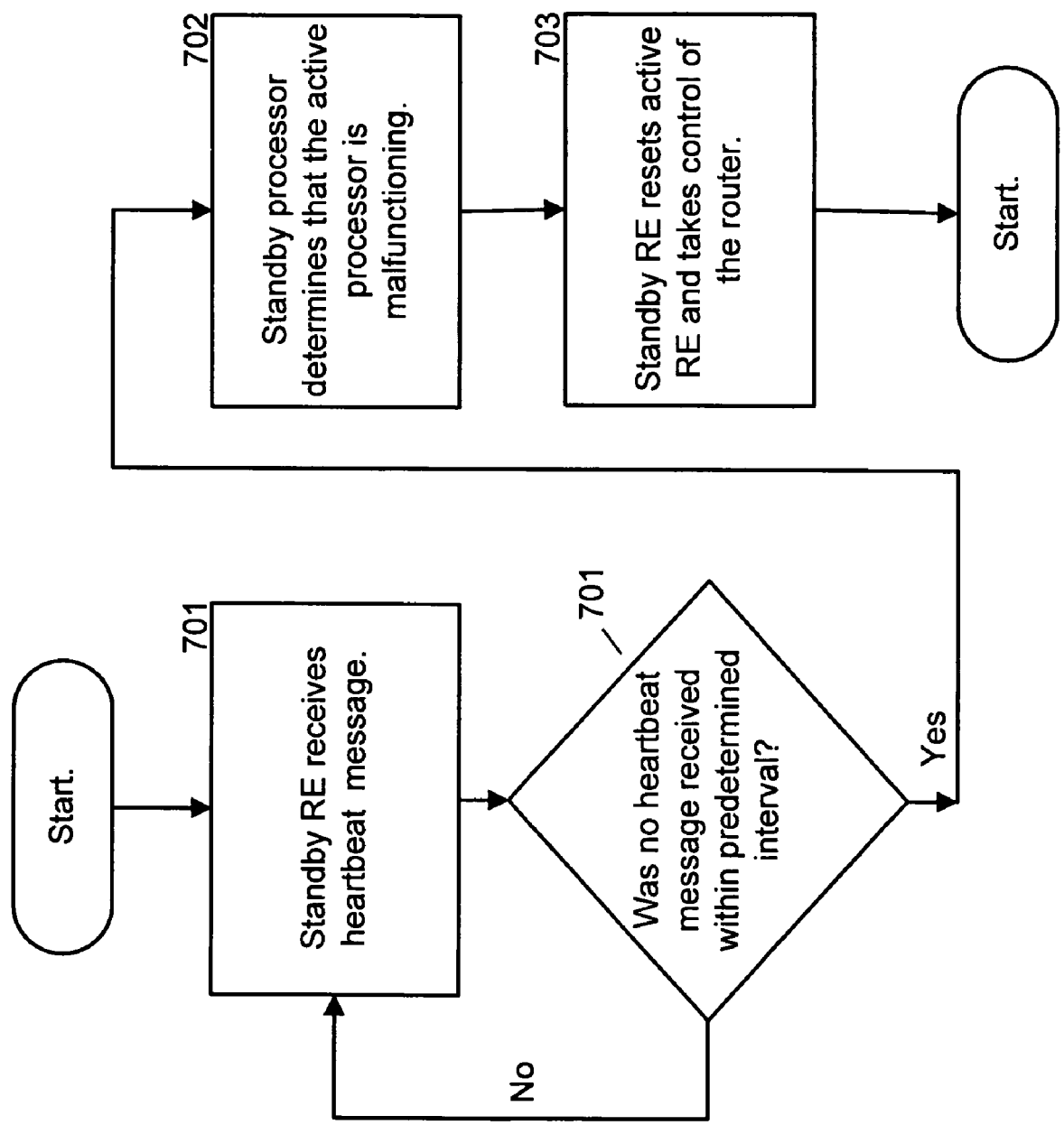
FIG. 7 is a flow chart illustrating methods, consistent with the present invention, for performing normal operation of the router.

FIG. 7 is a flow chart illustrating methods consistent with the present invention for operating router 100 during normal operation (i.e., after power-up). In general, during normal operation, the active routing engine 201 or 202 interacts with the active processing component 205 or 206 and packet manager 220. If the active routing engine fails, the standby routing engine takes control of redundancy controller 203. The standby routing engine may constantly maintain a recent copy of the forwarding table 116 along with any other required state information, allowing the standby router to immediately take control of the system in a transparent or near transparent manner relative to the external operation of router 100. Such state information can be exchanged while in the normal operation state (loopback MUX 310 "mode 2") through the Ethernet connection leading to redundancy switch 207 and processing components 205 and 206. Alternatively, the standby router may be held in a more dormant state, and thus require more time to come fully on-line during a control exchange.

The active RE and the standby RE exchange, at predetermined intervals, status information ("heartbeat" messages) that informs the standby RE that the active RE is functioning properly. (Act 700). If the standby RE fails to receive a heartbeat message from the active processor, it assumes the active processor is malfunctioning. (Acts 701 and 702). In this situation, the standby RE may reset the redundancy controller 203 by activating signal line 317 (RE 202) or 318 (RE 201), (Act 703), causing a reset operation to begin, as described above with reference to Acts 505-508 of FIG. 5. As previously stated, a reset operation causes the corresponding servant circuit 301 or 302 to reset the other servant circuit and the other RE, thus transferring control to the resetting RE.

Additionally, during normal operation, the active RE continuously monitors the active processing component. If the active processing component stops functioning, and a standby processing component is available, the active RE makes the standby processing component active.

Although router 100 is illustrated having two REs and two processing components, one of ordinary skill in the art will recognize that the above-described concepts could be extended to cover more than one extra RE and/or processing component.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

Although described as being primarily implemented in hardware, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The scope of the invention is defined by the claims and their equivalents.

What is claimed is:

1. A single router comprising:
   a packet manager to:
      receive an incoming packet,
      disassemble the packet into packet header information and a packet body,
      store the packet body, and
      transmit, within the router, the packet header information to a redundancy switch of the router;
   the redundancy switch to transmit, within the router and based on a signal received from a redundancy controller of the router, the packet header information to an active one, and not a non-active one, of a first processing component and a second processing component of the router;
   the active one of the first and second processing components to:
      determine, based on the packet header information, destination information for the packet, using a stored forwarding table received from an active one of a first routing engine and a second routing engine of the router, where the first and second processing components differ from the first and second routing engines, and
      process the packet header information to include the destination information;
   the active one and a non-active one, of the first and second routing engines, to each:
      maintain a routing table including routing information for a network, and
      construct the forwarding table from the routing information;
   the active one and not the non-active one, of the first and second routing engines, to provide, within the router, the forwarding table to the active one of the first and second processing components; and
   the redundancy controller to select, while maintaining the first and second routing engines in a redundant configuration, the active one of the first and second routing engines.

2. The router of claim 1, where maintaining the first and second routing engines in the redundant configuration includes resetting one of the first and second routing engines and allowing the other of the first and second routing engines to become the active one of the first and second routing engines.

3. The router of claim 1, where the redundancy controller further comprises:
   a first servant circuit connected to and controlled by the first routing engine; and
   a second servant circuit connected to and controlled by the second routing engine;
   where:
      the first servant circuit issues a reset command to the second servant circuit and the second routing engine based on a command from the first routing engine, and the second servant circuit issues a reset command to the first servant circuit and the first routing engine based on a command from the second routing engine, the reset command causing the servant circuit, receiving the reset command, to relinquish control of the router.

4. The router of claim 3, where the redundancy controller further comprises:
   a plurality of switches, each of the plurality of switches receiving a first input from the first servant circuit and a second input from the second servant circuit, and outputting one of the first and second inputs.

5. A single router for routing packets in a network, the router comprising:
   a packet manager to:
      disassemble the packets into packet header information and packet bodies, and
      transmit, within the router, the packet header information, and not the packet bodies, to a redundancy switch of the router;
   the redundancy switch to transmit, within the router and based on a signal received from a redundancy controller of the router, the packet header information to an active one, and not non-active ones, of a plurality of processing components of the router;
   the active processing component to determine destination information for the packets; and
   a plurality of routing engines to:
      maintain routing tables that contain packet routing information, construct forwarding tables from the routing information, and
      when active, provide, within the router, the forwarding tables to the active one, and not the non-active ones, of the plurality of processing components, one of the plurality of routing engines being an active routing engine and the other ones of the plurality of routing engines being non-active routing engines at any given time, where the processing components differ from the routing engines.

6. The router of claim 5, where the plurality of routing engines are further configured so that at least one of the non-active routing engines receives information from the active routing engine indicating whether the active routing engine is functioning, and the at least one of the non-active routing engines being configured to assert itself as the active routing engine when the at least one non-active routing engine fails to receive the information from the active routing engine.

7. The router of claim 6, where the redundancy controller resets the active routing engine when the at least one non-active routing engine asserts itself as the active routing engine.

8. The router of claim 7, where the redundancy controller includes:
   a first servant circuit connected to and controlled by the active routing engine; and
   a second servant circuit connected to and controlled by the at least one non-active routing engine;
   where the first servant circuit issues a reset command to the second servant circuit and the at least one non-active routing engine based on a command from the active routing engine, and the second servant circuit issues the reset command to the first servant circuit and the active routing engine based on a command from the non-active routing engine, the reset command causing the servant circuit receiving the reset command to relinquish control of the router.

9. The router of claim 8, where the redundancy controller further includes:
   a plurality of switches, each of the plurality of switches receiving a first input from the first servant circuit and a second input from the second servant circuit, and outputting one of the first and second inputs.

10. The router of claim 8, where the first and second servant circuits and the plurality of switches implement deadlock recovery of the plurality of routing engines.

11. A method performed in a single router including at least first and second routing engines coupled to a packet forwarding engine, the method comprising:
setting the first routing engine of the router to an active state, the first routing engine providing, within the router and while in the active state, a forwarding table to an active one, and not an active one, of a first processing component and a second processing component of the packet forwarding engine, where the first and second processing components differ from the first and second routing engines;
setting the second routing engine to a standby state;
redundantly maintaining a routing table in each of the first and second routing engines;
redundantly constructing, based on the routing tables, the forwarding table in each of the first and second routing engines;
disassembling, by a packet manager of the packet forwarding engine, an incoming packet into packet control information and a packet body;
transmitting, within the router, the packet control information, and not the packet body, to the active one, and the active one, of the first and second processing components;
determining, based on the packet control information and using the received forwarding table, destination information for the packet;
processing the packet control information to include the destination information;
re-assembling the packet from the processed packet control information and the packet body;
monitoring the first routing engine for operating failure; and
causing the second routing engine to assume the active state when the operating failure is detected in the first routing engine.

12. The method of claim 11, where the second routing engine assumes the active state by causing a servant circuit associated with the second routing engine to reset a servant circuit associated with the first routing engine, each of the servant circuits being independent of the respective routing engines.

13. The method of claim 11, further comprising:
outputting, based on the destination information, the re-assembled packet from the router to a network.

14. The method of claim 13, where the destination information identifies an output port of the router, and the outputting the re-assembled packet comprises transmitting the re-assembled packet to the network via the identified output port.

15. The router of claim 1, where the packet manager is further to:
receive the processed packet header information, including the destination information, from the redundancy switch,
re-assemble the packet from the processed packet header information and the stored packet body, and
output, based on the destination information, the re-assembled packet from the router to the network.

16. The router of claim 5, where the redundancy controller selects, while maintaining the plurality of routing engines in a redundant configuration, the active routing engine.

17. The router of claim 5, where the active processing component processes the packet header information to include the destination information, and the packet manager is further to:
receive, via the redundancy switch, the processed packet header information, including the destination information,
re-assemble the packets from the processed packet header information and the packet bodies, and
output, based on the destination information, the re-assembled packets from the router to the network.

* * * * *